United States Patent Office 3,501,528
Patented Mar. 17, 1970

3,501,528
PREPARATION OF PRIMARY AMINES BY HYDROGENATION OF NITRILES
Horst Rutzen, Dusseldorf-Holthausen, Germany, assignor to Henkel & Cie., G.m.b.H., Dusseldorf, Germany, a corporation of Germany
No Drawing. Filed Oct. 31, 1967, Ser. No. 679,516
Claims priority, application Germany, Dec. 7, 1966, H 61,209
Int. Cl. C07c 85/14
U.S. Cl. 260—583     4 Claims

ABSTRACT OF THE DISCLOSURE

A continuous process for the preparation of primary amines by catalytic hydrogenation of nitriles with excess hydrogen containing 3 to 15% by volume of ammonia.

PRIOR ART

While primary amines may be prepared in a variety of processes on a laboratory scale, the commercial production of primary amines has been prepared usually by catalytic hydrogenation of the corresponding nitriles under pressure which results in the formation of both primary and secondary amines. The presence of a considerable amount of ammonia has been found advantageous to obtain predominantly primary amines. Also, the addition of lower alkylamines and other nitrogen compounds to suppress the formation of secondary amines is well known.

German Auslegeschrift No. 1,190,949 describes a process for the continuous preparation of primary amines by the catalytical hydrogenation of nitriles with recycling of one part of the reaction product into the reaction mixture, characterized in that an aliphatic or cycloaliphatic mononitrile having about 8-24 carbon atoms is hydrogenated in the presence of a hydrogenation catalyst and ammonia at a temperature range of about 80°–200° C. and under a pressure of about 3.5–105 atmospheres with hydrogen with distillation of the reaction product containing chiefly primary amine from the hydrogenation zone, then cooling the reaction product and returning about 25–200% by weight of the hydrogenation product, after having been cooled during recycling, to the hydrogenation zone, into which a corresponding amount of mononitrile is continuously introduced. As hydrogenation catalysts, nickel, platinum, palladium or cobalt oxide catalysts are suggested. The latter catalyst is reduced to free metal during the process.

Although the said process results in good yields, its execution is costly and uneconomical due to the separation and cooling of part of the reaction product, which has to be returned to the recycle as well as to the use of expensive hydrogenation catalysts. A further disadvantage of this process is that as a result of hydrogenation tests on nickel contact with cyclization of the hydrogen-ammonia mixture, the metallic catalyst at the temperature claimed causes a relatively rapid decomposition of ammonia into nitrogen and hydrogen. Moreover, as hydrogen is consumed during the hydrogenation, the amount of nitrogen in the recycle gas increases so that the hydrogenation becomes incomplete and finally ceases altogether, unless the recycle gas, being adjusted to a pressure of 10–50 atmospheres, is completely replenished from time to time. However, considerable losses of hydrogen and ammonia occur thereby.

OBJECTS OF THE INVENTION

It is an object of the invention to provide a novel continuous process for the preparation of primary amines by hydrogenation of mononitriles with inexpensive oxidic catalysts.

It is another object of the invention to provide a novel process for the preparation of primary amines with reduced consumption of ammonia. These and other objects and advantages of the invention will become obvious from the following detailed disclosure.

THE INVENTION

The novel process of the invention for the continuous preparation of primary amines comprises hydrogenating a nitrile of a monocarboxylic acid selected from the group consisting of aliphatic and cycloaliphatic monocarboxylic acids of 4 to 24 carbon atoms at temperatures of about 220–400° C. and at a pressure of about 50 to 400 atmospheres with excess hydrogen containing 3 to 15% by volume of ammonia in the presence of a pellet metal catalyst in the oxidic form under the reaction conditions. Preferably, the reaction temperature is 250–330° C., the pressure is 100 to 300 atmospheres and the ammonia content is 5 to 12% by volume.

Examples of suitable nitrile starting materials are nitriles of aliphatic and cycloaliphatic monocarboxylic acids such as butyric acid, valeric acid, caproic acid, caprylic acid, higher fatty acids, such as lauric acid, myristic acid, mixtures of fatty acids derived from natural oils and fats such as coconut oil fatty acids, stearic acid, and soybean fatty acids, cyclohexanecarboxylic acid, etc.

In some instances, particularly with high boiling nitriles, the monocarboxylic acid nitrile is advantageously added to the reaction apparatus in solution in an inert solvent. Examples of suitable inert organic solvents are aliphatic and cycloaliphatic hydrocarbons and ethers such as hexane, cyclohexane, methylcyclohexane, ethyl ether, etc.

Examples of suitable metal catalysts which are oxidic under the reaction conditions are preferably zinc-chromium and zinc-aluminum oxidic catalysts.

Zinc-chromium oxidic catalysts for the invention may be prepared by admixing powdery zinc oxide with aqueous chromic acid, preferably large amounts in a kneading machine, whereby chromic acid combines with zinc oxide to form zinc chromate due to the heat of reaction. The zinc chromate can be converted into zinc chromite by slow reductions. The slow reduction is effected at 280–350° C. at a hydrogen pressure of 30 to 50 atmospheres in which the hydrogen pressure is gradually increased to avoid a significant temperature increase.

The zinc-chromium catalyst can also be prepared by reducing chromic acid to chromium III oxide hydrate such as with methanol and admixing the said hydrate in aqueous suspension with zinc oxide or zinc hydroxide or by admixing zinc oxide and chromium III hydroxide freshly precipitated from chromium III salts.

The zinc-aluminum oxide catalyst for the invention may be prepared by admixing powdery zinc oxide with an aqueous aluminum hydroxide suspension, preferably freshly precipitated aluminum hydroxide. The aluminum hydroxide may be amorphous or crystalline and γ-aluminum oxide may be used in place of the aluminum hydroxide.

Since the catalysts are preferably in pellet form for the hydrogenation, the aqueous paste mixture of catalyst is dried and broken into lumps or dried, ground into a powder, admixed with a binding agent and/or graphite and compressed into easily handled tablets.

The hydrogen is used in an excess of that theoretically required and is preferably 50 to 200 times the theoretical amount. The excess hydrogen not only has a desirable effect on the reaction equilibrium, but also ensures that the reaction is effected in the gaseous phase. For the latter purpose, a portion of the hydrogen can be replaced with any gas inert under the reaction conditions such as nitrogen. Preferably, the reaction is effected with technically pure hydrogen.

The process of the invention has the advantage that the mononitriles can be hydrogenated in a highly satisfactory manner using inexpensive oxidic catalysts with only insignificant ammonia losses which occur by a certain solubility of ammonia in the reaction product and small amounts escaping during depressurizing of the reaction product. However, these small amounts can be simply recovered by known methods and returned to the gas recycle system. Therefore, fresh ammonia need only be added periodically to replace the ammonia consumed.

In the following examples there are described several preferred embodiments to illustrate the invention. However, it should be understood that the invention is not intended to be limited to the specific embodiments.

Example I

Crystalline aluminum hydroxide having a bulk density of 1275 gm./liter and powdered technical zinc oxide in a 1:1 ratio were stirred into water and the suspension was vacuum filtered. The solid product was dried and admixed with 2% by weight of graphite after which the powder was compressed into 4 mm. tablets. 12 liters of the said tablets were added to a 14 liter capacity pressure vessel provided with gas recycle system, a water cooler and a pressure separator which separates the hydrogen and depressurizes the reaction products.

Hydrogen was introduced into the gas recycle system at a pressure of 200 atmospheres and the apparatus was heated to 290° C. whereby the hydrogen pressure increased to 240 atmospheres. Then, sufficient liquid ammonia was pumped into the system to provide a 5% ammonia gas volume after which 2 liters per hour of coconut oil nitrile was added to the system. The gas chromatic analysis of the said nitrile showed the following carbon chains therein:

| Nitrile: | Percent |
|---|---|
| $C_6$ | 1.1 |
| $C_8$ | 9.7 |
| $C_{10}$ | 8.0 |
| $C_{12}$ | 49.0 |
| $C_{14}$ | 18.0 |
| $C_{16}$ | 7.9 |
| $C_{18}$ | 6.3 |

The rate of the total gas recyclization amounted to 240 liters per hour at the reaction pressure specified. About 2 liters of clear, water white reaction product were separated through the pressure separator per hour. After the reaction product had been distilled over a 1 m-column packed with saddles, the following primary amines were identified by their boiling points:

| Primary amine: | Percent |
|---|---|
| $C_8$ | 7.5 |
| $C_{10}$ | 6.5 |
| $C_{12}$ | 46.5 |
| $C_{14}$ | 16.5 |
| $C_{16}$ | 6.0 |
| $C_{18}$ | 4.5 |
| Residue | 12.0 |

The residue consisted for the most part of higher alkylated (sec. and tert.) amines.

Example II 4 liters of the catalyst prepared in Example I were introduced in a 4-liter hydrogenation apparatus similar to that of Example I and hydrogen was introduced therein at a pressure of 250 atmospheres at 280° C. with a recycle rate of 240 pressure liters per hour. Then 100 grams of liquid ammonia was added thereto, followed by the addition of 0.2 liter per hour of the coconut acid nitrile used in Example I. About 0.2 liter per hour of a clear, water white reaction product were recovered and distilled as in Example I to obtain the following analysis:

| Primary amine: | Percent |
|---|---|
| $C_8$ | 8.5 |
| $C_{10}$ | 7.0 |
| $C_{12}$ | 46.5 |
| $C_{14}$ | 15.5 |
| $C_{16}$ | 9.5 |
| $C_{18}$ | 1.0 |
| Residue | 13.0 |

Example III 81 kg. of powdery technical zinc oxide and 50 kg. of chromium-VI-oxide were admixed in 30 liters of water in a kneading apparatus. After drying, pulverizing and an addition of 3% by weigh of graphite, the powdery mixture was compressed to 4 mm. tablets.

About 12 liters of the said catalyst were placed into the 14 liter hydrogenation apparatus of Example I. While recycling 330 liters of nitrogen per hour at a pressure of 35 atmospheres in the apparatus, hydrogen was continuously added in such an amount that the apparatus temperature did not exceed 280° C. and total gas pressure of 260 atmospheres was attained. The mixture was depressurized and fresh hydrogen was added after which 1 liter of coconut oil acid nitrile was fed into the apparatus per hour. The hydrogenation temperature was 290° C., the total recyclization rate was 330 pressure liters (pressure in atmospheres × volume in liters), per hour and the total pressure of the recycle gas, which contained 8% by volume of ammonia, was 250 atmospheres. About 1 liter per hour of an entirely colorless reaction product was distilled off through the pressure separator. The separation by distillation of the product gave the following composition:

| Primary amine: | Percent |
|---|---|
| $C_8$ | 8.0 |
| $C_{10}$ | 7.5 |
| $C_{12}$ | 49.0 |
| $C_{14}$ | 16.5 |
| $C_{16}$ | 8.0 |
| $C_{18}$ | 3.0 |
| Residue | 8.0 |

Example IV

About 12 liters of the zinc-chromium-catalyst prepared and treated as in Example III were fed into the 14 liter hydrogenation apparatus of Example I. Then 3 l. of a solution of 1 liter of coconut oil acid nitrile of Example 1 in 2 l. of methyl cyclohexane per hour were added thereto. 335 liters per hour of recycle gas under a total pressure of 260 atmospheres were passed through the apparatus. The recycle gas consisted of 97% by volume of hydrogen and 3% by volume of ammonia. The hydrogenation temperature was 310° C. To replace the ammonia consumed in the recycle process, 100 gm. per hour of fresh ammonia were fed into the apparatus. Distillation of the reaction product through an 80 cm. column packed with saddles showed, after separation of the solvent, the following composition:

| Primary amine: | Percent |
|---|---|
| $C_8$ | 6.1 |
| $C_{10}$ | 7.8 |
| $C_{12}$ | 45.0 |
| $C_{14}$ | 18.8 |
| $C_{16}$ | 7.2 |
| $C_{18}$ | 2.8 |
| Residue | 12.3 |

Example V

About 12 liters of a zinc-chromium catalyst prepared and treated as in Example III were fed into the 14 liter hydrogenation apparatus. Then 1 liter per hour of coconut oil acid nitrile of the composition of Example 1 was fed into the oven. At a total pressure of 260 atmospheres, 335 l. of a gas mixture consisting of about 147 atmospheres of hydrogen, 100 atmospheres of nitrogen and 13 atmospheres of ammonia, was passed per hour through the apparatus. The hydrogenation temperature was 310° C. To replace the ammonia consumed in the recycling process, 100 gm. per hour of fresh ammonia were fed into the apparatus. Distillation of the reaction product, recovered at a rate of about 1 liter per hour, through an 80 cm. column packed with saddles gave the following composition:

| Primary amine: | Percent |
|---|---|
| $C_8$ | 6.5 |
| $C_{10}$ | 7.5 |
| $C_{12}$ | 46.5 |
| $C_{14}$ | 15.0 |
| $C_{16}$ | 7.0 |
| $C_{18}$ | 5.5 |
| Residue | 12.0 |

Example VI

A distilled technical stearic acid nitrile was hydrogenated under the identical conditions of Example III. The said nitrile had the following carbon chain composition as determined by gas chromatography:
2.9% $C_{10}$, 3.2% $C_{12}$, 5.8% $C_{14}$, 33.6% $C_{16}$, 53.7% $C_{18}$ and 0.8% $C_{20}$. The throughput of the stearic acid nitrile through the 14 l.-oven amounted to 1 liter per hour. The total pressure ranged at 260 atmospheres, the temperature was 310° C. To maintain the volume proportion of 5% ammonia in the recycle gas, 100 gm. of ammonia were fed per hour into the apparatus. About 1 liter of water-clear amine mixture was distilled per hour through the pressure separator. Distillation of the amine in an 80 cm.-column packed with saddles resulted in the following composition:

| Primary amine: | Percent |
|---|---|
| $C_{12}$ | 1.5 |
| $C_{14}$ | 6.5 |
| $C_{16}$ | 27.0 |
| $C_{18}$ | 48.0 |
| Residue | 17.0 |

Example VII 1 liter per hour of pure caprylic acid nitrile was passed through the 14 liter hydrogenation apparatus under the same conditions as described in Example III. The total pressure amounted to 260 atmospheres and the reaction temperature was 300° C. The percent by volume of ammonia in the recycle gas was 9%. 400 gm. of ammonia were fed hourly into the apparatus to compensate for any losses. Distillation of the amine product in an 80 cm.-column packed with saddles showed that the reaction product consisted of 90% of n-octyl-amine and 10% of higher alkylated amines.

Various modifications of the process of the invention may be made without departing from the spirit or scope thereof.

I claim:

1. A process for the continuous preparation of primary amines which comprises hydrogenating a nitrile of a monocarboxylic acid selected from the group consisting of aliphatic and cycloaliphatic monocarboxylic acids of 4 to 24 carbon atoms at temperatures of about 220 to 400° C. and at a pressure of about 50 to 400 atmospheres with excess hydrogen containing 3 to 15% by volume of ammonia in the presence of a pellet metal catalyst in the oxidic form under the reaction conditions selected from the group consisting of zinc-chromium oxidic catalyst and zinc-aluminum oxidic catalyst.

2. The process of claim 1 wherein the reaction temperature is 250° to 330° C. and the pressure is 100 to 300 atmospheres.

3. The process of claim 1 wherein the ammonia content is 5 to 12% by volume.

4. The process of claim 1 wherein the nitrile is derived from an aliphatic carboxylic acid of 4 to 24 carbon atoms.

References Cited

UNITED STATES PATENTS 3,235,600   2/1966   Evans.

CHARLES B. PARKER, Primary Examiner

R. L. RAYMOND, Assistant Examiner

U.S. Cl. X.R.

252—463, 468; 260—563